Figure 1:
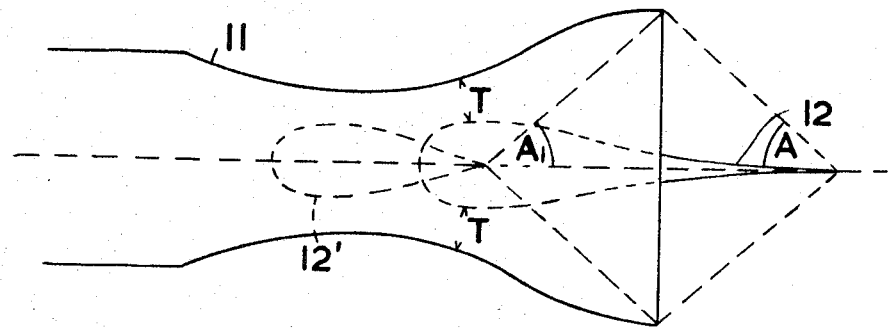

Inventor
LIONEL HENRY TOWNEND

_3,443,757_
SUPERSONIC FLUID FLOW EXHAUST NOZZLES
Lionel Henry Townend, Farnham, Surrey, England, assignor to Minister of Aviation in Her Britannic Majesty's Government of the United Kingdom of Great Britain and Northern Ireland, London, England
Filed Oct. 14, 1966, Ser. No. 586,798
Int. Cl. B64d 33/04, 33/06; F02k 1/26
U.S. Cl. 239—265.13                         17 Claims This invention relates to supersonic fluid flow nozzles of the well-known convergent-divergent duct (or Laval) type.

The invention is illustrated herein by way of example by particular reference to exhaust nozzles of the plug type.

The so-called plug exhaust nozzles comprises a generally axisymmetrical streamlined plug located on and aligned with the axis of a convergent-divergent duct of generally circular cross section. In this type of nozzle the fluid flow Mach number is 1 at the smallest cross-sectional area region of the nozzle which is known as the throat. Downstream of the throat the cross-sectional area of the nozzle increases progressively to the exit and the fluid expands towards the circular or annular exit through which it is finally discharged at supersonic speed.

When a nozzle discharges a supersonic (or high velocity subsonic) flow into a region of ambient air in which air velocities are relatively low (e.g. at the take-off conditions of an aircraft), it is found that a very high noise level results from the shearing which occurs around the jet of moving air.

The present invention is concerned with the provision of a supersonic flow exhaust nozzle having improved silencing characteristics.

A supersonic flow exhaust nozzle of the convergent-divergent duct type comprising a convergent inlet section, a divergent exhaust section and a throat intermediate thereof according to the present invention has two or more lobes which extend longitudinally to the exit of the nozzle from a position at or near the throat, the area of the lobed exit measured as a projection on a plane normal to the axis of symmetry being ideally the same as the theoretical exit area of a supersonic flow exhaust nozzle having the required exit mass flow, both nozzles having the same exit Mach number and velocity, and the generation of the inner surfaces of the lobes being based on supersonic flow theory.

The invention is applicable to three dimensional, three dimensional axisymmetric and two dimensional flows.

Preferably the lobes extend from upstream of the throat area to the exit there being a smooth lead in region from the convergent section of the duct upstream of the throat to the lobes at the throat.

The exit of a lobed nozzle may be such that trailing edges lie for example perpendicularly to the axis of symmetry of the nozzle, i.e. the trailing edges of all lobes may be co-planar, but this may result in a loss of thrust and/or an increase in skin friction drag compared to the preferred arrangement according to the invention in which, for an axisymmetric flow model having a parallel exit flow of specified exit Mach number M, the exit region of each lobe is such that the trailing edge would lie on the surface of a cone, of semi-apex angle $=\sin^{-1} 1/M_{exit}$, and which in the case of a plug nozzle has its apex at (or downstream of) the aft tip of the plug, and may have its apex pointing either upstream or downstream according to whether the lobes of the plug nozzle are to be swept back or swept forward.

It is possible to arrange that the trailing edge of a given lobe lies on the surface of the cone and in a single plane (at an angle to the axis greater than $\sin^{-1} 1/M_{exit}$), but in general the side view of a lobe will display a curved (non-planar) trailing edge. Also, a lobe trailing edge may lie in a series of planes and/or curves.

In the case of a plug type nozzle the throat area may be varied by incorporating in the nozzle provision for relative (generally axial) movement between the plug and the duct.

Figure 2:
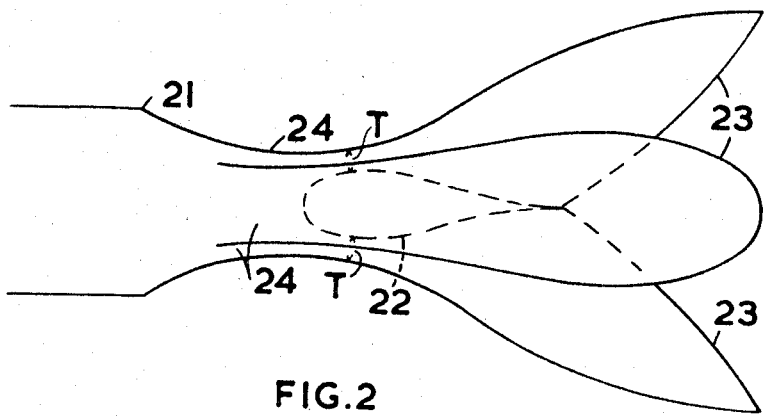
Figure 3:
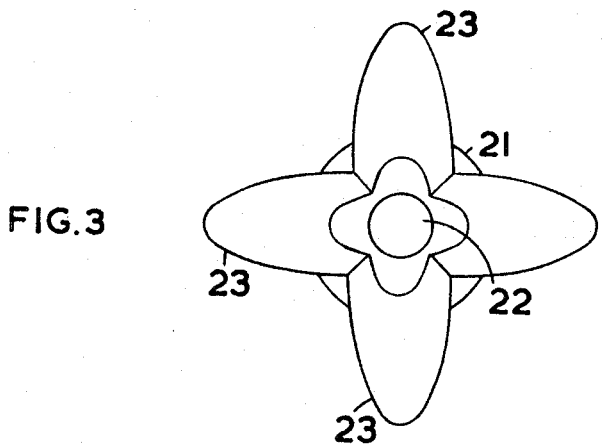
Figure 4:
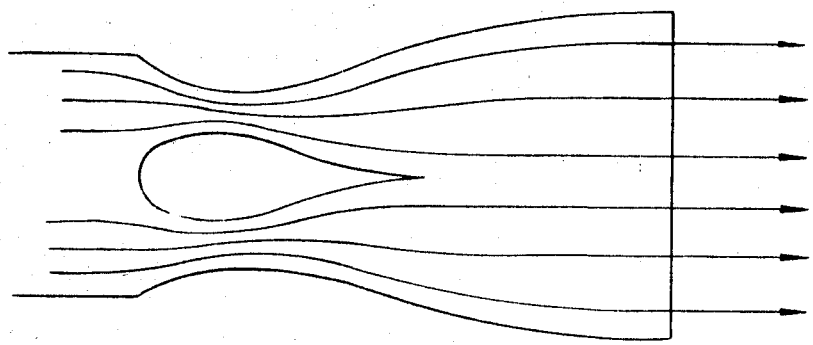
Figure 5:
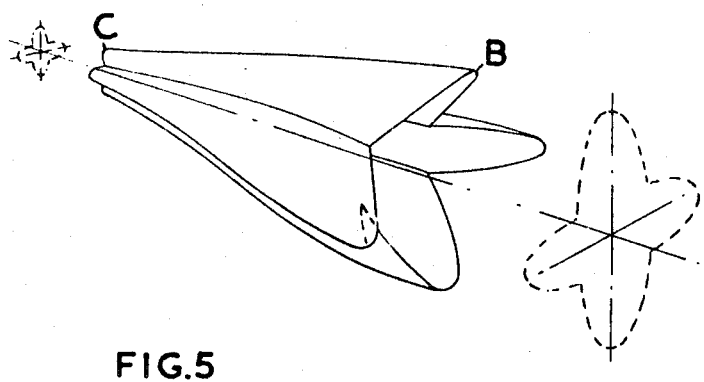
Figure 6:
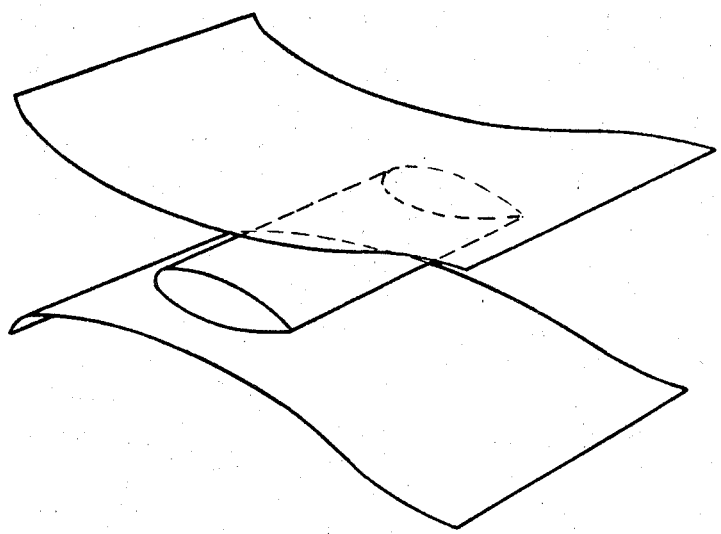
Figure 7:
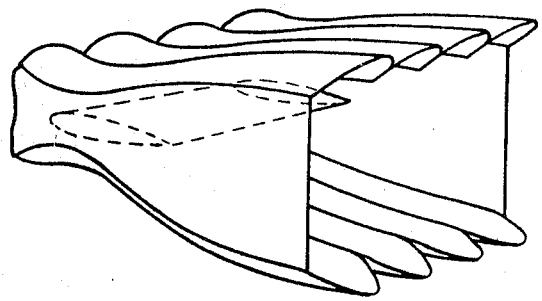

The invention is illustrated by FIGURES 1–5 of the diagrammatic drawings accompanying the provisional specification and the accompanying FIGURES 6 and 7 of which:

FIGURE 1 shows in side elevation a known plug type exhaust nozzle,

FIGURES 2 and 3 show in side and end elevation, respectively, a plug type nozzle according to the invention, FIGURE 4 shows the streamline flow pattern of an existing plug type nozzle, FIGURE 5 shows a four lobed nozzle (of the swept-back type) according to the invention, FIGURE 6 shows a typical two dimensional plug type nozzle, and, FIGURE 7 shows a two dimensional flow plug nozzle according to the invention.

Referring first to FIGURE 1, this shows a nozzle comprising a circular duct 11 of convergent-divergent configuration and an axisymmetric plug 12. The angle A, which is herein called the cut off angle, is a function of the exit Mach number M of the flow and is equal to $\sin^{-1} 1/M_{exit}$. The exit Mach number will vary for different design conditions but in a typical example for an aircraft designed to cruise at about Mach 2 the desirable exit Mach number will be about 2.5. The plug may protrude from the rear of the duct as shown in which case it is described herein as a swept-forward plug nozzle or it may be housed completely within the duct (with the angle $A_1 = A = \sin^{-1} 1/M_{exit}$) as shown at $12^1$ when it is described herein as a swept-back plug nozzle. The flow Mach number at the throat T will be about Mach 1 when the nozzle pressure ratio is sufficient to produce sonic or supersonic fluid flows and the flow speed at the exit region will, at the design value of nozzle pressure ratio, correspond to the design value of $M_{exit}(>1)$ the flow under these design conditions issuing parallel to the axis of symmetry.

Referring now to FIGURES 2 and 3, the nozzle has a duct 21 and axisymmetric plug 22 forming between them a passage having a throat region T. At the upstream end, the duct 21 may be of circular cross-section as shown in FIG. 3 but at the downstream end is formed into four lobes 23 . . . 23. Each lobe 23 has a lead in region 24 which provides a smooth changeover from the cross-section upstream of the throat to the four lobed cross-sections at and downstream of the throat.

The shape of the inner surface of the lobes 23 . . . 23 is developed in accordance with three dimensional flow theory. Thus, consider for example axisymmetric flow of cross-section shown at FIGURE 4 and select, for example, a four lobed exit shape as shown at B in FIGURE 5. The throat shape at C to give the exit shape B can be deduced by tracing back each streamline which passes through the four lobed exit shape shown at B, the shape of such a streamline being identical throughout its length with the particular streamline thus specified in the chosen flow model, e.g. that of FIGURE 4. In this way, the shape of the whole duct may be completely defined, and corresponds to a stream surface defined in the chosen axisymmetric flow model.

Whilst illustrated with respect to a swept-back type plug nozzle the design method used in the invention is equally applicable to swept-forward plug nozzles and to the design of lobed supersonic flow convergent-divergent nozzles without plugs.

It is to be noted that the emphasis on flows having axial symmetry has been for simplicity of illustration only. The design approach described can also be used with a two-dimensional flow, typically that formed by the plug type of nozzle shown at FIGURE 6 in which the plug comprises a streamline wedge 61. Tracing streamlines in such a flow would allow the design of partly corrugated nozzles such as that of FIGURE 7 having lobes 71 . . . 71 in the convergent-divergent walls, side-walls 72, 72 and a streamlined wedge 73, and variable geometry may be achieved by plug translation and/or by hinging the lobed walls 71 . . . 71 and/or the side walls 72, 72 of the duct.

I claim:

1. An exhaust nozzle of the convergent-divergent duct type for fluid flow at supersonic exhaust speeds comprising,
   a convergent inlet region,
   a divergent exhaust region,
   a throat region intermediate said convergent and divergent regions,
   said nozzle having a plurality of lobes which extend longitudinally to the exit region of the nozzle from the region of the throat and being axisymmetric forward of said lobes;
   the area of the lobed exit when measured as a projection on a plane normal to the axis of symmetry being ideally the same as the theoretical exit area of a supersonic flow exhaust nozzle having the required exit mass flow, both nozzles having the same exit Mach number and velocity, and the generation of the inner surfaces of the lobes being based on supersonic flow theory.

2. An exhaust nozzle as claimed in claim 1 and a generally axisymmetrical plug of streamlined lateral cross section located on and aligned with the axis of symmetry of the duct.

3. An exhaust nozzel as claimed in claim 2 having means for effecting relative movement between the nozzle and the plug to vary the area of the throat.

4. An exhaust nozzle as claimed in claim 1 in which for axisymmetric flow having parallel exit flow of specified exit Mach number M, the trailing edge of each lobe lies on the surface of a cone of semi-apex angle= $\sin^{-1} 1/M_{exit}$, the apex pointing upstream or downstream according to whether the trailing edges of the lobes are swept-forward or swept-back with respect to the flow from the axis of symmetry of the duct.

5. An exhaust nozzle as claimed in claim 4 having a generally axisymmetrical plug of streamlined lateral cross section located on and aligned with the axis of symmetry of the duct.

6. An exhaust nozzle as claimed in claim 5 in which the apex of the cone is not forward of the aft tip of the plug.

7. An exhaust nozzle as claimed in claim 1 in which the trailing edge of each lobe lies in a single plane at an angle to the axis of symmetry greater than $\sin^{-1} 1/M_{exit}$.

8. An exhaust nozzle as claimed in claim 7 having generally axisymmetrical plug of streamlined lateral cross section located on and aligned with the axis of symmetry of the duct.

9. An exhaust nozzle as claimed in claim 8 having means for effecting relative movement between the nozzle and the plug to vary the area of the throat.

10. An exhaust nozzle as claimed in claim 7 in which the plane of each lobe intersects the axis of symmetry of the nozzle not forward of the aft tip of the plug.

11. An exhaust nozzle of the convergent-divergent duct type for fluid flow at supersonic exhaust speeds comprising,
    two pairs of opposed walls defining the duct,
    one of said pairs of walls being of convergent-divergent form symmetrically disposed with respect to an intermediate plane of symmetry and comprising,
      a convergent inlet region,
      a divergent exhaust region, and,
      a throat region intermediate said convergent and divergent regions,
      said one pair of walls having at least one lobe in each wall which extends longitudinally to the exit of the nozzle from the region of the throat and said nozzle being symmetrical about said plane of symmetry forward of said lobes;
    the area of the lobed exit when measured as a projection on a plane normal to the plane of symmetry being ideally the same as the theoretical exit area of supersonic flow exhaust nozzle having the required exit mass flow, both nozzles having the same exit Mach number and velocity, and the generation of the inner surfaces of the lobes being based on two dimensional supersonic flow theory.

12. An exhaust nozzle as claimed in claim 11 having a two dimensional streamlined wedge located within the throat of the nozzle and extending across it with the streamlined surfaces of the wedge each facing a corresponding one of said one pair of convergent-divergent walls.

13. An exhaust nozzle as claimed in claim 12 having means for effecting relative movement between the nozzle and the plug to vary the area of the throat.

14. An exhaust nozzle as claimed in claim 11 in which for two dimensional flow having parallel exit flow of specified exit Mach number M, the trailing edge region of each lobe lies in a single plane at an angle to said intermediate plane of symmetry greater than $\sin^{-1} 1/M_{exit}$.

15. An exhaust nozzle as claimed in claim 14 having a two dimensional streamlined wedge located within the throat of the nozzle and extending across it with the streamlined surfaces of the wedge each facing a corresponding one of said one pair of convergent-divergent walls.

16. An exhaust nozzle as claimed in claim 15 having means for effecting relative movement between the nozzle and the plug to vary the area of the throat.

17. An exhaust nozzle as claimed in claim 15 in which the plane of each lobe intersects the intermediate plane of symmetry not forward of the aft tip of wedge.

References Cited

UNITED STATES PATENTS

| | | | |
|---|---|---|---|
| 2,664,700 | 1/1954 | Benoit | 181—33.221 |
| 2,973,921 | 3/1961 | Price | 60—271 |
| 3,053,340 | 9/1962 | Kutney | 239—265.13 |
| 3,061,038 | 10/1962 | Lawler et al. | 239—265.13 |
| 3,174,282 | 3/1965 | Harrison | 239—265.19 |

OTHER REFERENCES

Noise Control, January 1959, p. 18, Noise Suppressors for Jet Engines by C. E. Callaghan.

EVERETT W. KIRBY, *Primary Examiner.*

U.S. Cl. X.R.

60—231; 181—33; 239—265.19